United States Patent
Liang et al.

(10) Patent No.: US 10,536,628 B2
(45) Date of Patent: Jan. 14, 2020

(54) PROVIDING CAMERA SETTINGS FROM AT LEAST ONE IMAGE/VIDEO HOSTING SERVICE

(71) Applicant: Telefonaktiebolaget LM Ericsson (publ), Stockholm (SE)

(72) Inventors: Hongxin Liang, Upplands Väsby (SE); Konstantinos Vandikas, Solna (SE); Anna Viggedal, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/769,594

(22) PCT Filed: Oct. 23, 2015

(86) PCT No.: PCT/SE2015/051123
§ 371 (c)(1),
(2) Date: Apr. 19, 2018

(87) PCT Pub. No.: WO2017/069670
PCT Pub. Date: Apr. 27, 2017

(65) Prior Publication Data
US 2018/0316853 A1  Nov. 1, 2018

(51) Int. Cl.
*H04N 5/232* (2006.01)
*H04N 1/32* (2006.01)
*H04N 1/00* (2006.01)
*H04L 12/46* (2006.01)
*G03B 19/00* (2006.01)

(52) U.S. Cl.
CPC ..... *H04N 5/23222* (2013.01); *H04N 1/32122* (2013.01); *H04N 2201/0084* (2013.01)

(58) Field of Classification Search
CPC ....... H04N 5/23222; H04N 2201/3252; H04N 2201/3253; H04N 1/00244; H04L 12/4625; G03B 19/00
See application file for complete search history.

(56) References Cited

U.S. PATENT DOCUMENTS 8,508,622 B1  8/2013 Anon
2001/0048815 A1  12/2001 Nakajima et al.
(Continued)

FOREIGN PATENT DOCUMENTS

KR  2010-0066210 A  6/2010

OTHER PUBLICATIONS

Extended European Search Report dated Sep. 19, 2018, issued for European patent application No. 15906804.8, 7 pages.
(Continued)

*Primary Examiner* — Ahmed A Berhan
(74) *Attorney, Agent, or Firm* — Rothwell, Figg, Ernst & Manbeck, P.C.

(57) ABSTRACT

Camera settings are provided by retrieving, based on current metadata defining a current position of a camera (5) and from a storage, metadata defining respective positions of other cameras and camera settings used by the other cameras when taking photos or videos that are uploaded on an image/video hosting service. Information representative of camera settings used when taking a photo/video selected among the photos/videos available on the image/video hosting service is provided for transmission to the camera (5).

17 Claims, 9 Drawing Sheets

(56) References Cited

U.S. PATENT DOCUMENTS

| | | |
|---|---|---|
| 2004/0174434 A1 | 9/2004 | Walker et al. |
| 2007/0073937 A1 | 3/2007 | Feinberg et al. |
| 2007/0183767 A1* | 8/2007 | Kasai ............... G03B 17/00 396/56 |
| 2009/0049082 A1 | 2/2009 | Slaney et al. |
| 2011/0069179 A1 | 3/2011 | Bathiche et al. |
| 2014/0049652 A1* | 2/2014 | Moon ............... H04N 9/8233 348/207.1 |
| 2014/0122465 A1 | 5/2014 | Bilinski et al. |
| 2014/0267868 A1* | 9/2014 | Mazzola ........... H04N 5/23222 348/333.02 |
| 2014/0300775 A1 | 10/2014 | Fan et al. |
| 2015/0142857 A1 | 5/2015 | Collins et al. |
| 2015/0180713 A1 | 6/2015 | Stewart et al. |

OTHER PUBLICATIONS

International Search Report and Written Opinion issued in International Application No. PCT/SE2015/051123 dated Sep. 20, 2016, 12 pages.

* cited by examiner

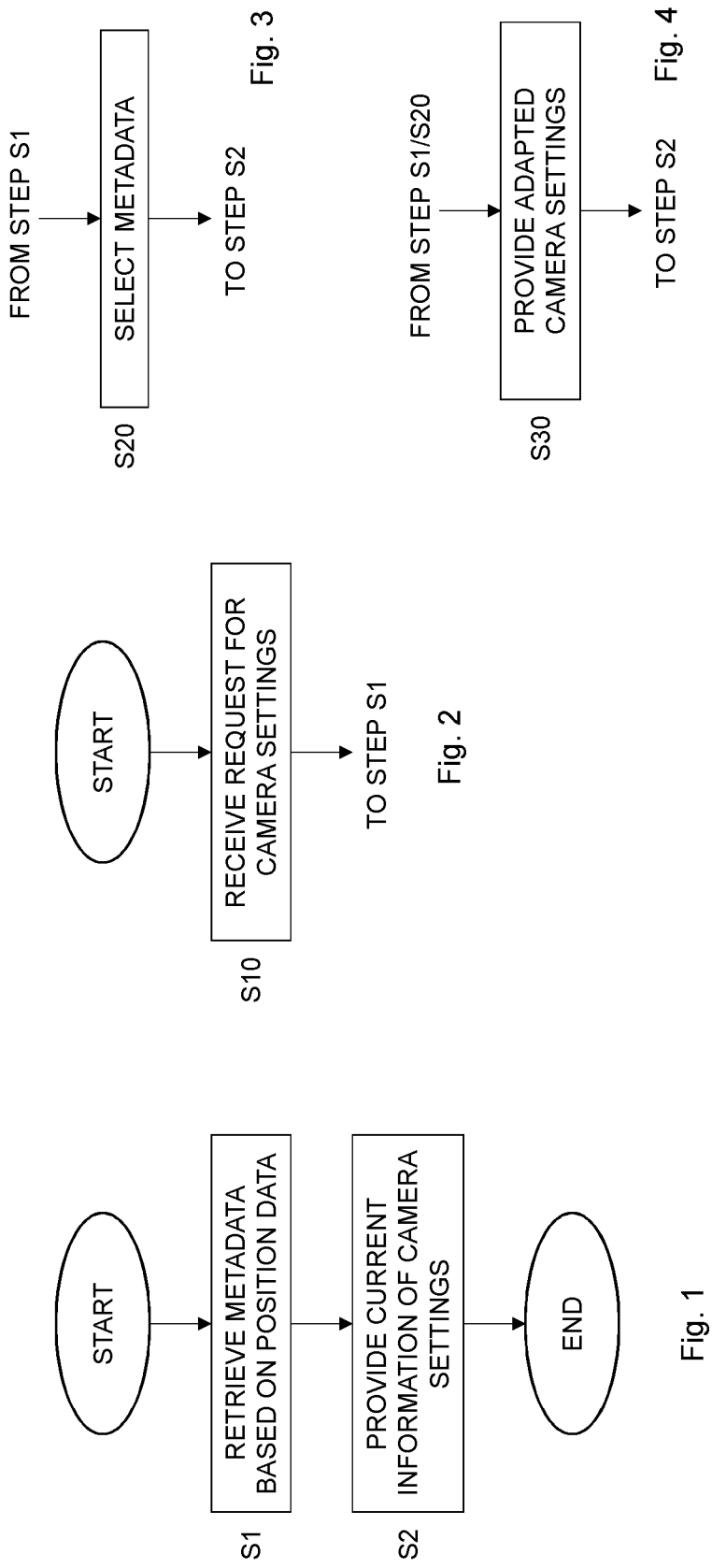

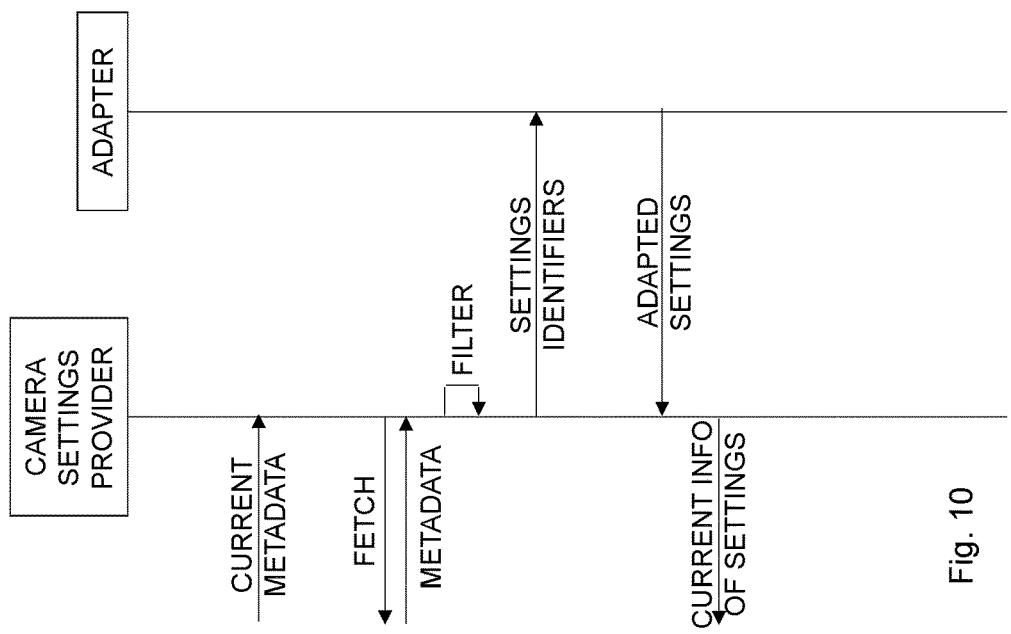
Fig. 10
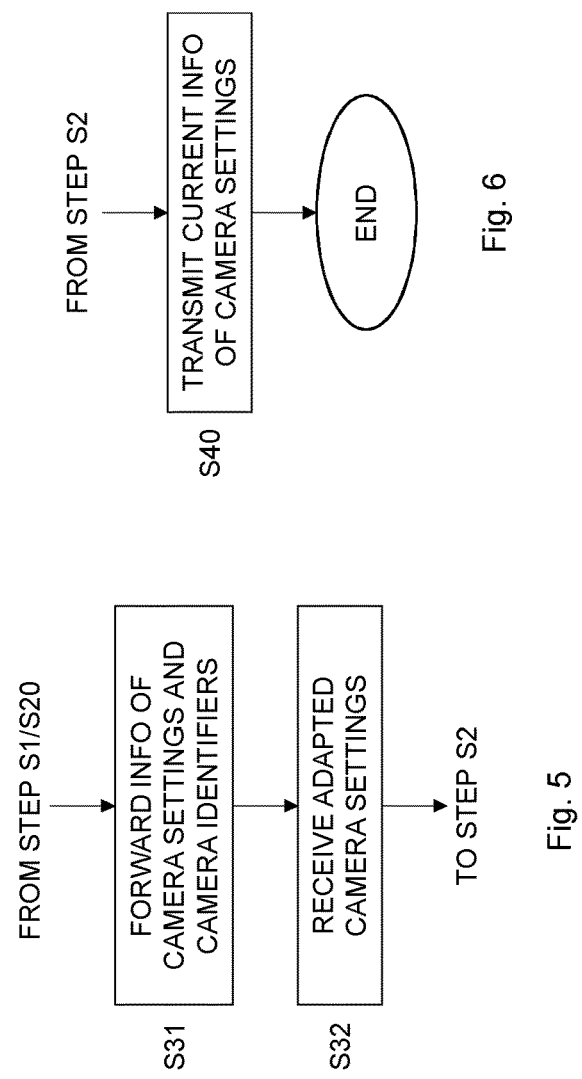
Fig. 6
Fig. 5

US 10,536,628 B2

PROVIDING CAMERA SETTINGS FROM AT LEAST ONE IMAGE/VIDEO HOSTING SERVICE

CROSS REFERENCE TO RELATED APPLICATION(S)

This application is a 35 U.S.C. § 371 National Stage of International Patent Application No. PCT/SE2015/051123, filed Oct. 23, 2015, designating the United States, the disclosure of which is incorporated by reference.

TECHNICAL FIELD

The present embodiments generally relate to a method, devices, computer program and computer program product, network node and carrier for providing camera settings.

BACKGROUND

Today, camera settings can in most cameras, from point-and-shoot to professional Digital Single-Lens Reflex (DSLR) cameras, be used to adapt to different environments. Normally, when a user wants to take a picture he/she manually adjusts the camera settings, such as shutter settings and/or aperture settings, based on his/her own view. Some cameras are capable of remembering the last camera settings that the user had when a previous picture was taken. Other cameras are capable of storing different presets of previously used camera settings that can be chosen among.

These prior art solutions of selecting optimal camera settings are, however, based on the user's knowledge and choice. In particular, novice photographers with limited experience may find it hard to select suitable camera settings for a current environment and scene.

There is therefore a need for a solution of finding suitable camera settings for taking a picture or recording a video.

US 2015/0180713 discloses receiving an automatic setting from a sharing participant and comparing this automatic setting to a corresponding local automation setting. The local automation setting is then adjusted based on the comparison. The system, the local automation setting of which that is adjusted, is a home automation system, such as a climate control system or a home security system. In the latter case, the home security system may adjust security camera settings, access settings, lock down settings and the like based on the received automatic setting.

SUMMARY

An objective of the embodiments is to enable a more easy provision of camera settings, which may be used by a camera when taking a photograph or recording a video.

This and other objectives are met by embodiments as disclosed herein.

An aspect of the embodiments relates to a method of providing camera settings. The method comprises retrieving, based on current metadata comprising current position data of a current camera and from a storage, metadata comprising position data and information representative of camera settings for photographs and/or videos available on at least one image and/or video hosting service. The method also comprises providing, for transmission to the current camera, current information representative of camera settings used when taking a photograph or recording a video selected among the photographs and/or videos available on the at least one image and/or video hosting service.

Another aspect of the embodiments relates to a device for providing camera settings. The device is configured to retrieve, based on current metadata comprising current position data of a current camera and from a storage, metadata comprising position data and information representative of camera settings for photographs and/or videos available on at least one image and/or video hosting service. The device is also configured to provide, for transmission to the current camera, current information representative of camera settings used when taking a photograph or recording a video selected among the photographs and/or videos available on the at least one image and/or video hosting service.

A related aspect of the embodiments defines a device for providing camera settings. The device comprises a retrieving unit for retrieving, based on current metadata comprising current position data of a current camera and from a storage, metadata comprising position data and information representative of camera settings for photographs and/or videos available on at least one image and/or video hosting service. The device also comprises a providing unit for providing, for transmission to the current camera, current information representative of camera settings used when taking a photograph or recording a video selected among the photographs and/or videos available on the at least one image and/or video hosting service.

A further aspect of the embodiments defines a computer program comprising instructions, which when executed by at least one processor, cause the at least one processor to retrieve, based on current metadata comprising current position data of a current camera and from a storage, metadata comprising position data and information representative of camera settings for photographs and/or videos available on at least one image and/or video hosting service. The at least one processor is also caused to provide, for transmission to the current camera, current information representative of camera settings used when taking a photograph or recording a video selected among the photographs and/or videos available on the at least one image and/or video hosting service.

A related aspect of the embodiments defines a computer-program product comprising a computer-readable medium having stored thereon a computer program as defined above.

Another related aspect of the embodiments defines a carrier comprising a computer program as defined above. The carrier is one of an electronic signal, an optical signal, an electromagnetic signal, a magnetic signal, an electric signal, a radio signal, a microwave signal, or a computer-readable storage medium.

The present technology provides camera settings based on crowdsourcing. This enables novice photographers with limited experience of correctly setting cameras to receive information of suitable camera settings.

BRIEF DESCRIPTION OF THE DRAWINGS

The embodiments, together with further objects and advantages thereof, may best be understood by making reference to the following description taken together with the accompanying drawings, in which:

FIG. 1 is a flow chart illustrating a method of providing camera settings according to an embodiment;

FIG. 2 is a flow chart illustrating an additional, optional step of the method shown in FIG. 1 according to an embodiment;

FIG. 3 is flow chart illustrating an additional, optional step of the method shown in FIG. 1 according to another embodiment;

FIG. 4 is flow chart illustrating an additional, optional step of the method shown in FIG. 1 according to a further embodiment;

FIG. 5 is flow chart illustrating additional, optional steps of the method shown in FIG. 1 according to an embodiment;

FIG. 6 is flow chart illustrating an additional, optional step of the method shown in FIG. 1 according to yet another embodiment;

FIG. 10 is a signal diagram illustrating signaling between a camera settings provider and an adapter during provision of camera settings using crowdsourcing;

DETAILED DESCRIPTION

Figure 7:
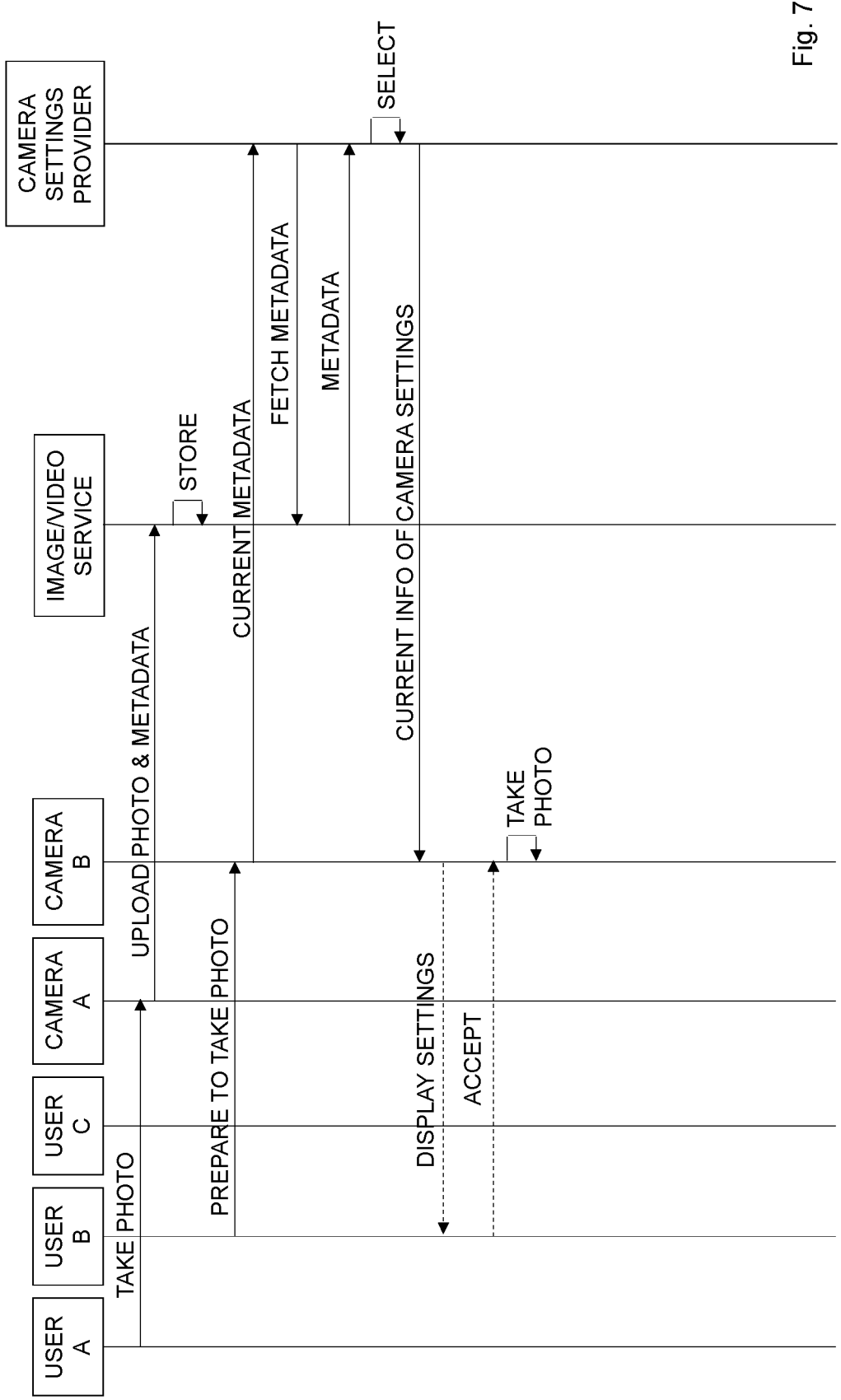
FIG. 7 is a signal diagram illustrating providing camera settings using crowdsourcing according to an embodiment.

Throughout the drawings, the same reference numbers are used for similar or corresponding elements.

The present embodiments generally relate to provision of camera settings, and in particular provision of camera settings based on crowdsourcing.

The present technology enables provision of suitable camera settings for photographers and where such camera settings have previously been used by other photographers taking pictures or recording video of a substantially same or similar scene. The provision of camera settings is thereby based on crowdsourcing since users will share information of suitable camera settings to other users.

The present embodiments are able to achieve this crowdsourcing-based provision of camera settings using a centralized or distributed functionality that retrieves information of previously used camera settings, selects a most appropriate camera setting for a current user and provides information of the selected camera settings to the current user. This means that no special requirements or updates of the cameras of the users are needed except being able to communicate information within a wireless or wired communication network.

FIG. 1 is a flow chart illustrating a method of providing camera settings according to an embodiment. The method comprises retrieving, in step S1 and based on current metadata comprising current position data of a current camera and from a storage, metadata comprising position data and information representative of camera settings for photographs and/or videos available on or via at least one image and/or video hosting service. A next step S2 comprises providing, for transmission to the current camera, current information representative of camera settings used when taking a photograph or recording a video selected among the photographs and/or videos available on the at least one image and/or video hosting service.

Thus, users publish or share photographs and/or videos on at least one image and/or video hosting service, also denoted image and/or video sharing service, image and/or video hosting/sharing service provider or image and/or video hosting/sharing server herein. In addition, metadata comprising position data and information representative of camera settings is stored for the photographs and/or videos on a storage, such as in one or more databases or servers.

Current metadata comprising current position data of a current camera is then used to retrieve relevant metadata from the storage. The retrieved metadata comprises, among others, information representative of camera settings used when taking a photograph or recording video uploaded on the at least one image and/or video hosting service. Current information representative of camera settings selected among the retrieved metadata is provided for transmission to the current camera.

There the user can select to adopt the received camera settings or the current camera automatically adopts the received camera settings. In either case, the camera is then set to camera settings that previously have been used by at least one other user at substantially the same place as defined by the current position data in the current metadata and the position data in the retrieved metadata. This means that the current camera can use camera settings that have previously been used when taking photographs or recording video at the substantially same place or location. Hence, suitable camera settings adapted for the current scene as defined based on the current position data and the position data are selected and forwarded to the current camera. Accordingly, the present embodiments achieves a more easy provision of camera settings the current user and his/her camera.

The metadata comprising the position data and the information representative of camera settings for those photographs and/or videos available on the at least one image and/or video hosting service could be any information or data comprising the relevant information and data, i.e. at least position data and information of camera settings. For instance, the exchangeable image file format (Exif) specifies the formats for images with the addition of specific metadata tags. Such metadata tags in the Exif standard include data and time information; camera settings including static information, such as camera model, and adjustable information, such as orientation, i.e. rotation, aperture, shutter speed, focal length, metering mode and ISO information; position or location information, i.e. geotagging data; etc.

Today, metadata tags according to the Exif standard can be employed for, among others, Joint Photographic Experts Group (JPEG) files, i.e. .jpg, .jpeg, .jpe, .jif, .jfif and .jfi files; Tagged Image File Format (TIFF) files, i.e. .tif files; and Waveform Audio File Format (WAVE or simply WAV) files, i.e. .wav and .wave files.

Furthermore, ExifTool is a free and open-source software program for reading, writing, and manipulating image, audio, and video metadata. ExifTool is commonly incorporated into different types of digital workflows and supports many types of metadata including Exif, the International Press Telecommunications Council Information Interchange Model (IPTC IIM), Extensible Metadata Platform (XMP), JPEG File Interchange Format (JFIF), GeoTIFF, International Color Consortium (ICC) Profile, Photoshop Image Resource Block (IRB), FlashPix, AXS File Concatenation Protocol (AFCP) and ID3.

In particular, XMP is an ISO standard for the creation, processing and interchange of standardized and custom metadata for digital documents and data sets. XMP standardizes a data model, a serialization format and core properties for the definition and processing of extensible metadata. It also provides guidelines for embedding XMP information into popular image, video and document file formats without breaking their readability by applications that do not support XMP.

The above illustrated examples of files and formats used for carrying metadata associated with photographs or video can be used according to the embodiments. Also other known metadata carrying files and formats could be used as defined herein.

The storage could thereby be regarded as storing multiple sets of metadata, on such metadata set for each photograph and/or video. Each metadata set then comprises position data defining a respective position and information representative of camera settings.

The metadata may be uploaded and stored together with the associated photograph or video on the at least one image and/or video hosting service. In such a case, the storage comprising the metadata and from which the metadata is retrieved in step S1 is a storage of the at least one image and/or video hosting service. In an alternative approach, the storage with the metadata may be different from the at least one image and/or video hosting service. In such a case, the metadata can be uploaded to the storage separately from uploading the photograph or video at the at least one image and/or video hosting service. A further alternative is that the metadata is uploaded together with the photograph or video at the at least one image and/or video hosting service, which in turn forwards to or stores the metadata in the storage.

The at least one image and/or video hosting service could be any hosting or sharing service, service provider or server or indeed multiple, i.e. at least two, hosting or sharing services, service providers or servers at which users can upload and share their photographs and videos. Examples include so called social media services and websites including, but not limited to, Facebook, Google+, Pinterest, Instagram, Flickr, Vimeo, YouTube, etc.

FIG. 2 is a flow chart illustrating an additional, optional step of the method shown in FIG. 1. The method comprises receiving, in step S10, a request for camera settings from the current camera. In this embodiment, the request comprises the current metadata. The method then continues to step S1 in FIG. 1, where the metadata is retrieved from the storage based on the current metadata in the request received in step S10.

In an embodiment, step S1 of FIG. 1 comprises retrieving, from the storage, metadata comprising position data defining a position matching a current position of the current camera as defined by the current position data comprised in the current metadata.

Hence, in this embodiment the metadata retrieved from the storage in step S1 is metadata comprising position data defining a position or location matching, i.e. corresponding to, the current position or location of the current camera as defined by the current position data. This means that the metadata retrieved from the storage was generated for a respective photograph or video taken or recorded at substantially the same position or location as the current position or location of the current camera.

Generally, the storage comprises metadata for various photographs and/or video available on the at least one image and/or video hosting service and where these photographs have been taken at different locations and the videos have been recorded at different locations. The retrieval of metadata in step S1 is therefore preferably performed so that only metadata for photographs and/or videos taken or recorded at the substantially the same location as the current location of the current camera is retrieved. This is achieved by comparing the position data of the metadata in the storage with the current position data from the current metadata. If a position data matches or corresponds to the current position data, i.e. defines substantially the same position or location, the metadata is of relevance and should be retrieved from the storage.

A position matches or corresponds to the current position of the current camera if the position data defining the position does not differ more than a predefined amount from the current position data defining the current position. For instance, if the (current) position data defines geographical coordinates retrieved from e.g. satellite-based positioning systems like GPS, Glonas, Gallileo and Beidu, such as in latitude and longitude coordinates, e.g. decimal degrees (DD) or degrees, minutes, seconds (DMS), then position data could match the current position data if the respective geographical coordinates do not differ more than a fixed or preset value from the geographical coordinates of the current position data, e.g. Lat$\pm\Delta_{LAT}$, Long$\pm\Delta_{LONG}$. An offset or difference may also be determined more dynamically, i.e. in dependence on received geographical coordinates from the camera. The offset value may be larger for a position within a predetermined area defined as e.g. a rural area, in comparison with another position within an area predefined as being within a city or other more densely populated area. Alternatively, or in addition, position matches can be determined by first determining if the current position of the current camera indicates that the current camera is in a certain building or point of interest and then matching that point of interest with point of interests represented by the position data from the metadata. Accordingly, there are various way of determining whether position matches depending on what type of the position data that is generated by the cameras and included in the metadata and the current metadata. The embodiments are thereby not limited to a particular matching example but rather encompass various ways of determining whether a position matches or corresponds to the current position depending on what type of position data comprised in the metadata and the current metadata.

In an embodiment, the current metadata comprises current direction data for the current camera in addition to the current position data. Correspondingly, the metadata comprises direction data for a camera used when taking a photograph or recording a video of the photographs and/or videos available on the at least one image and/or video hosting service. In such an embodiment, the method preferably comprises an additional step S20 as shown in FIG. 3. The method continues from step S1 in FIG. 1. Step S20 then comprises selecting metadata among the metadata retrieved from the storage (in step S1 of FIG. 1) based on the current direction data retrieved from the current metadata and the direction data retrieved from the metadata. The method then continues to step S2 in FIG. 1.

Hence, in this embodiment at least two criteria are used in order to select metadata and provide information of suitable camera settings for the current camera. The first criterion is the position at which the photograph was taken or the video was recorded versus the current position of the current camera. The second criterion is the direction used when taking the photograph or recording the video versus the current direction of the current camera.

In a preferred embodiment, only camera settings for taking photographs or recording videos so that both of these criteria are met are preferably regarded as suitable camera settings for the current camera.

A reason to include the direction in addition to the position used when taking the photograph or recording the video in the selection is that different camera settings may be suitable at different directions even if the position is the same as the current position. For instance, standing at a given position and facing north could present a landscape scene at which a first set of camera settings is most appropriate. However, if the user instead faces south, he/she could stand in front of a beautiful building as a scene at which a second, different set of camera settings would be most appropriate. The second set of camera setting would then be inappropriate if the current user faces north and is about to take a landscape photograph and the first set of camera settings would likewise be inappropriate if the current user instead faces south to take a photograph of the building.

This means that more appropriate camera settings could be identified and retrieved from metadata from the storage by matching both the current position data with the position data and the current direction data with the direction data.

A direction matches or corresponds to the current direction of the current camera if the direction data defining the direction does not differ more than a predefined amount from the current direction data defining the direction position. The (current) direction data could be in the form of orientation or rotation data. In such a case, the value of the orientation or rotation as defined in direction data should not differ more than a fixed or preset value from the value of the orientation or rotation as defined in the current direction data.

In an embodiment, step S20 therefore comprises selecting metadata associated with a photograph or video, among the photographs and/or videos available on the at least one image and/or video hosting service, taken or recorded at a position matching a current position of the current camera as defined by the current position data comprised in the current metadata and in a direction matching the current direction of the current camera as defined by the current direction data retrieved from the current metadata.

Metadata associated with a photograph or video indicates the metadata relevant for the photograph or video and thereby comprising information, such as camera settings, employed when taking the photograph or video. For instance, a metadata tag according to the Exif standard is associated with its JPEG, TIFF or WAVE file.

In an embodiment, the current metadata comprises information of initial camera settings of the current camera. In such a case, step S20 of FIG. 3 preferably comprises selecting metadata among the metadata retrieved from the storage (in step S1 of FIG. 1) based on the information of the initial camera settings retrieved from the current metadata and the information representative of the camera settings retrieved from the metadata.

For example, step S20 could comprise selecting metadata associated with a photograph or video, among the photographs and/or videos available on the at least one image and/or video hosting service, taken or recorded by a camera having a focal length as defined by the information representative of the camera settings retrieved from the metadata matching an initial focal length of the current camera as defined by the information of the initial camera settings retrieved from the current metadata.

In this example, information of focal lengths is used in the selection of step S20. The focal length of a camera could provide an indication of whether the object or scene to capture is close to or far from the camera.

A focal length matches or corresponds to the initial focal length of the current camera if the focal length does not differ more than a fixed or present value from the initial focal lengths, i.e. $f \pm \Delta_f$.

This means that it is possible differentiate pictures or videos available on the at least one image and/or video hosting service depending on whether they capture a close up scene or a scene far away. Generally, different camera settings are suitable for photographs and videos with a short focal length as compared to photographs and videos where a longer focal lengths is preferred.

In another example, step S20 comprises selecting metadata associated with a photograph or video, among the photographs and/or videos available on the at least one image and/or video hosting service, taken or recorded by a camera having a camera mode as defined by the information representative of the camera settings retrieved from the metadata matching an initial camera mode of the current camera as defined by the information of the initial camera settings retrieved from the current metadata.

In this example, information of camera modes is used in the selection of step S20. Generally a camera may have different camera modes suitable for different types of scenes, such as a portrait mode; a landscape mode; a night mode; a macro or close-up mode, etc. It is generally preferred to select camera settings that was used when taking a photograph or recording video using a same camera mode as the initial mode of the current camera.

The selection of metadata based on initial camera settings, such as focal length and/or camera mode, can be combined with the described selection criterion, i.e. based on the direction data.

In an embodiment, the current metadata comprises information of a current time of day and the metadata comprises information of a time of day at which a photograph was taken or a video was recorded. In such a case, step S20 of FIG. 3 could comprise selecting metadata among the metadata retrieved from the storage (in step S1 of FIG. 1) based on the information of the current time of day retrieved from the current metadata and the information of the time of day retrieved from the metadata.

The time of day could be an indication of the lighting conditions used when taking a photograph or recording a video. Thus, there is generally different lightings depending on whether it is night, morning, midday or dusk.

The selection in step S20 could then be performed to select metadata associated with a photograph or video taken or recorded at substantially the same time of day as the current time of day. This could correspond to that the time of a photograph or video is within the range time$\pm \Delta_{time}$, wherein time represents the current time of day and $\Delta_{time}$ represents a fixed or present difference time value.

The selection of metadata based on time of day can be combined with any of the other previously described selection criteria, such as based on direction data and/or based on initial camera settings, such as focal length and/or camera mode.

In addition, or as an alternative to the time of day, the date could be comprised in the current metadata and the metadata. If the camera used for taking the photograph or recording video comprises, or is incorporated or connected to a device having, functionality to provide information of whether condition also such information could be used in the selection of step S20.

In an embodiment, the photographs and/or videos available on the at least one image and/or video hosting service have a respective user rating. In such an embodiment, step S20 of FIG. 3 preferably comprises selecting metadata among the metadata retrieved from the storage (in step S1 in FIG. 1) based on the user ratings retrieved from the metadata.

For instance, step S20 could comprise selecting metadata associated with the N photographs and/or videos having the highest user rating among the photographs and/or videos available on or retrieved from the at least one image and/or video hosting service. The parameter N is an integer equal to or larger than one.

This example thereby comprises selecting the highest rated photograph and/or video if N=1 or the highest rated photographs and/or videos if N>1 among the photographs and/or videos available on the at least one image and/or video hosting service. This embodiment thereby selects up to a fixed or preset number N of photographs and/or videos and thereby N metadata sets and where this number of photographs and/or videos are the highest ranked one(s) among the photographs and/or videos available on the at least one image and/or video hosting service.

In another example, step S20 comprises selecting metadata associated with at least one photograph and/or video having a user rating equal to or higher than a minimum user rating among the photographs and/or videos available on or retrieved from the at least one image and/or video hosting service.

In this example, there is no fixed or preset number of photographs and/or videos or sets of metadata. In clear contrast, there is a fixed or preset minimum user rating that the photographs and/or videos must meet in order to be selected in step S20.

It is of course possible to combine these two examples by specifying a maximum number N of photographs and/or videos and in addition requiring that the photographs and/or videos should have a user rating equal to or higher than the minimum user rating.

The user rating employed in these embodiments could be any user rating employed in the particular image and/or video hosting service. For instance and depending on the particular image and/or video hosting service, users may like or dislike a photograph and/or video, share a photograph and/or video or indeed rate a photograph and/or video. In such a case, the number of such "likes" or "dislikes" or the number of times a photograph and/or video has been shared could be used as user rating. A further variant of user rating is the number of times users have viewed a photograph or watched a video available on the at least one image and/or video hosting service.

This embodiment is based on the idea that camera settings employed when taking a very popular photograph or when recording a very popular video as determined based on the user ratings would be appropriate to use for the current camera. Photographs or videos with low user ratings could be due to inappropriate camera settings resulting in, for instance, blurred photographs or unclear videos.

This embodiment of using user ratings can be combined with any of the previously described embodiments. Hence, the user rating criterion can be used together with the position data; together with the position data and the direction data; together with the position data and the initial camera settings; together with the position data and the time of day (and/or date); together with the position data, the direction data and the initial camera settings; together with the position data, the direction data and the time of day (and/or date); together with the position data, the initial camera settings and the time of day (and/or date); or together with the position data, the direction data, the initial camera settings and the time of day (and/or date). In any of these embodiments, information of weather conditions could optionally be used as an additional selection or filtering criterion.

In an embodiment, step S1 comprises retrieving metadata associated with photographs and/or videos meeting the position criterion. A selection step then uses at least one additional criterion among direction, user rating, initial camera settings and time of day (and/or date), to select, among the retrieved metadata, metadata for the photographs(s) and/or video(s) meeting the at least one additional criterion. The information of the camera settings is then retrieved from the metadata for the photographs(s) and/or video(s) meeting the at least one additional criterion.

In a related embodiment, metadata associated with photographs and/or videos meeting the position criterion is retrieved in step S1. The following selection step uses at least one additional criterion among direction, initial camera settings and time of day (and/or date), to filter the metadata and output metadata for which the photograph or video meets not only the position criterion but also the at least one additional criterion. In a second selection step, the photograph or video having the highest user ratings is selected among the photographs(s) and/or video(s) meeting the position criterion and the at least one additional criterion. The information of the camera settings is then retrieved from the metadata for the photograph or video meeting the criterion or criteria and having the highest user rating.

In another embodiment, step S1 comprises retrieving metadata associated with photographs and/or videos meeting the position criterion and at least one additional criterion among direction, user rating, initial camera settings and time of day (and/or date). A selection step uses user rating in order to select the photograph or video having the highest user ratings among the photograph(s) and/or video(s) retrieved from the at least one image and/or video hosting service. In this embodiment, the filtering of photographs and/or videos is thereby used in the retrieval step.

In an embodiment, the current metadata comprises an identifier of the current camera and the metadata comprises an identifier of a camera used when taking a photograph or recording a video of the photographs and/or videos available on the at least one image and/or video hosting service. In such a case, the method preferably comprises an additional step as shown in FIG. 4. The method continues from step S1 in FIG. 1 or step S20 in FIG. 3. A next step S30 comprises providing adapted camera settings obtained by adapting, based on the identifier of the current camera and an identifier of a camera, camera settings defined by metadata retrieved from said storage. The method then continues to step S2 in FIG. 1, which comprises providing current information representative of the adapted camera settings for transmission to the current camera.

In this embodiment, the camera settings retrieved from the selected metadata are not provided directly to the current camera. In clear contrast, the camera settings are first adapted or adjusted based on information, i.e. identifiers, of the current camera and the camera used to take or record a photograph or video associated with the selected metadata.

A reason for such an adaptation or adjustment can be that different camera models have different value ranges for different camera settings. For instance, the current camera may have a lower maximum shutter speed, a smaller maximum aperture size and/or a lower maximum ISO value as compared to the other camera. This means that the camera settings used by the other camera cannot be used directed for the current camera but needs first to be adjusted to consider the differences in, for instance, maximum aperture shutter speed, maximum aperture size and/or maximum ISO value.

The identifier of the current camera and the other camera are preferably in the form of information of camera model, which is today present in Exif tags. Other types of identifiers could be serial number, optionally together with information of camera manufacturer.

In an embodiment, step S30 is performed as shown in the flow chart of FIG. 5. The method continues from step S1 in FIG. 1 or step S20 in FIG. 3. This embodiment comprises forwarding, in step S31 information representative of camera settings, the identifier of the current camera and the identifier of the camera to a settings adapting unit. A next step S32 comprises receiving the adapted camera settings from the settings adapting unit. The method then continues to step S2 of FIG. 1.

In this embodiment, the adaptation of the camera settings is performed by an external unit, the so called settings adapting unit or simply adapter. The information necessary to perform the adaptation, i.e. the identifiers and the information of the camera settings, is then forwarded thereto. The settings adapting unit then returns the adapted camera settings that have been adapted based on the received identifiers as descriptive of the respective capabilities of the current camera and the other camera(s).

It could be possible that different sets of camera settings from different metadata and thereby used by different other cameras when taking photographs and/or recording videos available on the at least one image and/or video hosting service are selected and deemed to be optimal for the current camera. In such a case, the camera settings to select for the current camera or input in the adaptation could be an average of the different sets of camera settings or another combination of the different sets of camera settings. For instance, each camera setting, such as shutter setting, aperture setting, focal length setting, ISO setting, zoom settings, etc., could then be defined as the average setting value among the different sets of camera settings.

FIG. 6 is a flow chart of an additional, optional step of the method shown in FIG. 1. The method continues from step S2 in FIG. 1. A next step S40 comprises transmitting the current information of the camera settings to the current camera. Thus, the information of the camera settings provided in step S2 is transmitted to the current camera in this step S40. The transmission is preferably conducted over a wireless or wired communication network.

In another embodiment, step S40 comprises transmitting the current information of the camera settings to a network node of a wireless communication network for temporary pre-caching or storage of the current information of the camera settings prior to transmission of the current information of the camera settings to the current camera.

This embodiment allows scheduling of transmission of the current information of the camera settings to the current camera at a suitable point in time by temporarily caching or storing the current information in a network node.

For instance, in a famous place, people tend to take photographs of exactly the same scene. In such a case, current information of camera settings can be broadcasted, multicasted or unicasted from a network node to all or selected cameras when they are about to take photographs. This means that the network node then pre-caches the current information of the camera settings on behalf of the cameras and disseminate it to all or selected users when needed.

FIG. 7 is a signal diagram illustrating providing camera settings using crowdsourcing according to an embodiment. In this and the following FIGS. 8-10, a single user A takes a photograph that is uploaded together with its associated metadata at an image and/or video hosting service. In most practical applications, several or even a vast amount of different users take photographs or record videos at different locations and of different scenes and upload them on the image and/or video hosting service. Furthermore, FIGS. 7-10 have been exemplified by users taking photographs. The embodiments are likewise applicable for users recording videos instead with their cameras.

In the signaling, user A takes a photograph with his/her camera A. Camera A uploads the photograph together with metadata comprising position data and information representative of the camera settings of camera A used when taking the photograph. In this embodiment, both the photograph and the metadata are uploaded to an image and/or video hosting service, where they are stored in a storage, database or server. User B is then about to take a photograph using his/her camera B. Camera B then transmits current metadata comprising current position data of camera B and user B to a camera settings provider. This transmission of the current metadata can, for instance, take place when user B half presses the shutter button, switches camera B on, presses a particular button or other user input on camera B or some other trigger. The camera settings provider filters metadata stored at the image and/or video hosting service based on, in this embodiment, positions or locations. This could be performed by transmitting a request to the image and/or video hosting service with the current position data retrieved from the received current metadata. The image and/or video hosting service then returns metadata having position data that matches the current position data as previously described herein. The camera settings provider then selects camera settings from the metadata received from the image and/or video hosting service or generates average camera settings from all received metadata. In either case, current information of the camera settings is then transmitted to camera B. In a first embodiment, camera B automatically adjusts its camera settings in accordance with the received current information of camera settings. In a second embodiment, camera B may first display the camera settings on a screen of or connected to camera B for user B. User B can then select whether to accept or reject the camera settings. If user B accepts the camera settings by activating a button or other user input of camera B, camera B adjusts its camera settings based on the received current information. Then, camera B takes a photograph using the newly adjusted camera settings.

Figure 8:
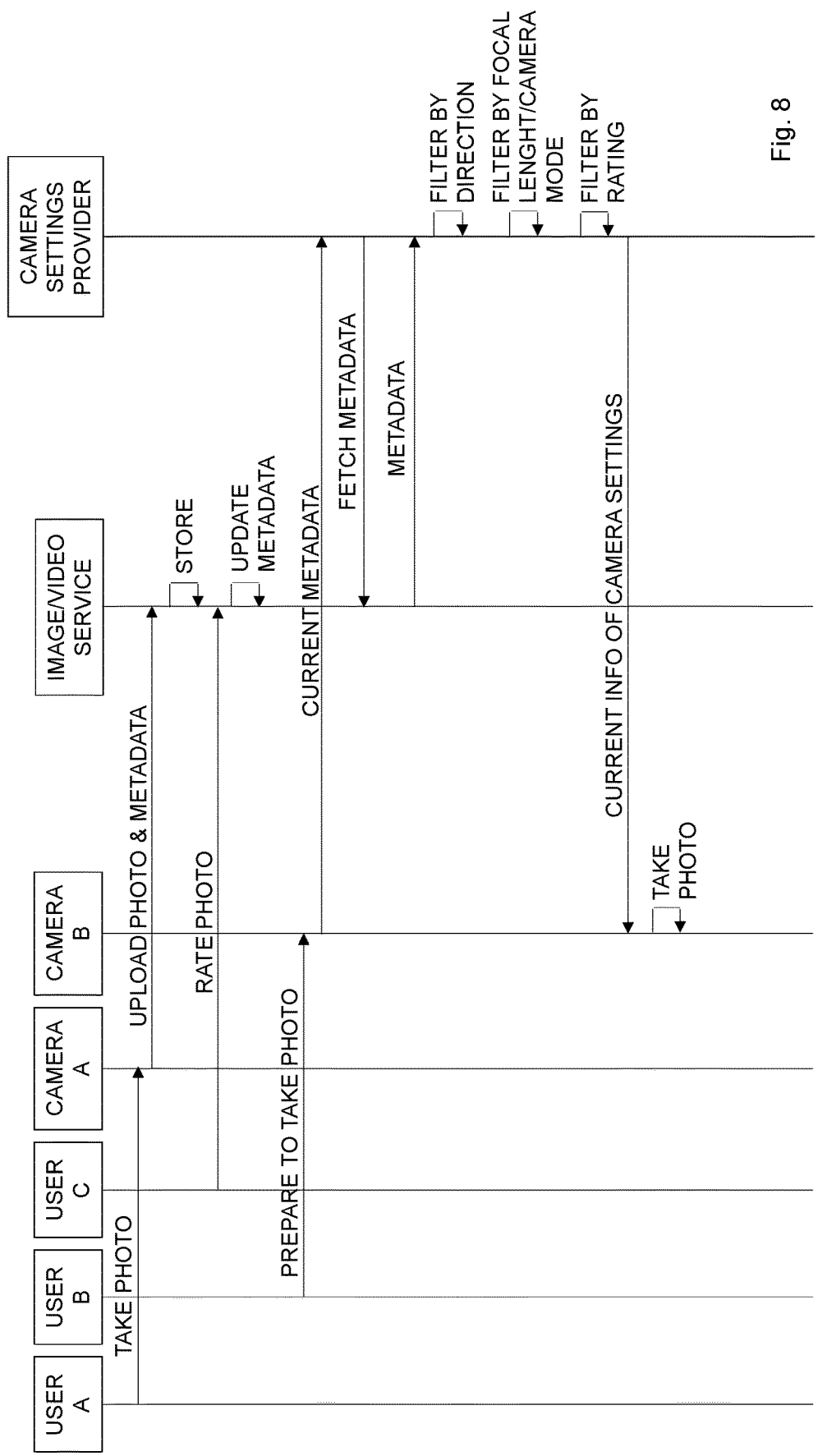
FIG. 8 is a signal diagram illustrating providing camera settings using crowdsourcing according to another embodiment.

FIG. 8 illustrates a signal diagram according to another embodiment. This embodiment employs user ratings and additional selection or filter criteria in the selection process. The initial signaling is the same as in FIG. 7. In this case, various users, represented by user C in the figure, can view photographs uploaded on the image and/or video hosting service, such as using an application, computer program or on a Web site. The users may additionally rate the viewed photographs as previously described herein. When user C rates the photograph uploaded by user A the metadata associated with the photograph stored at the image and/or video hosting service is updated to include the user rating by user C. The following signaling is the same as in FIG. 7 up to and including the reception of the metadata by the camera settings provider. In this case, one or more selection criteria in addition to the position of user B is used. This corresponds to filtering the received metadata by direction; camera settings, such as focal length and/or camera mode; time of day; and/or user rating as previously described herein.

The last filtering by user rating could, in an embodiment, be performed by selecting the metadata for the photograph meeting all selection criteria and having the highest user rating. The camera setting provider then compiles the current information representative of the camera settings retrieved from the selected metadata and forwards them to camera B. In this embodiment, the received camera settings are automatically used by camera B. Alternatively, the display and user acceptance as shown in FIG. 7 could be used.

Figure 9:
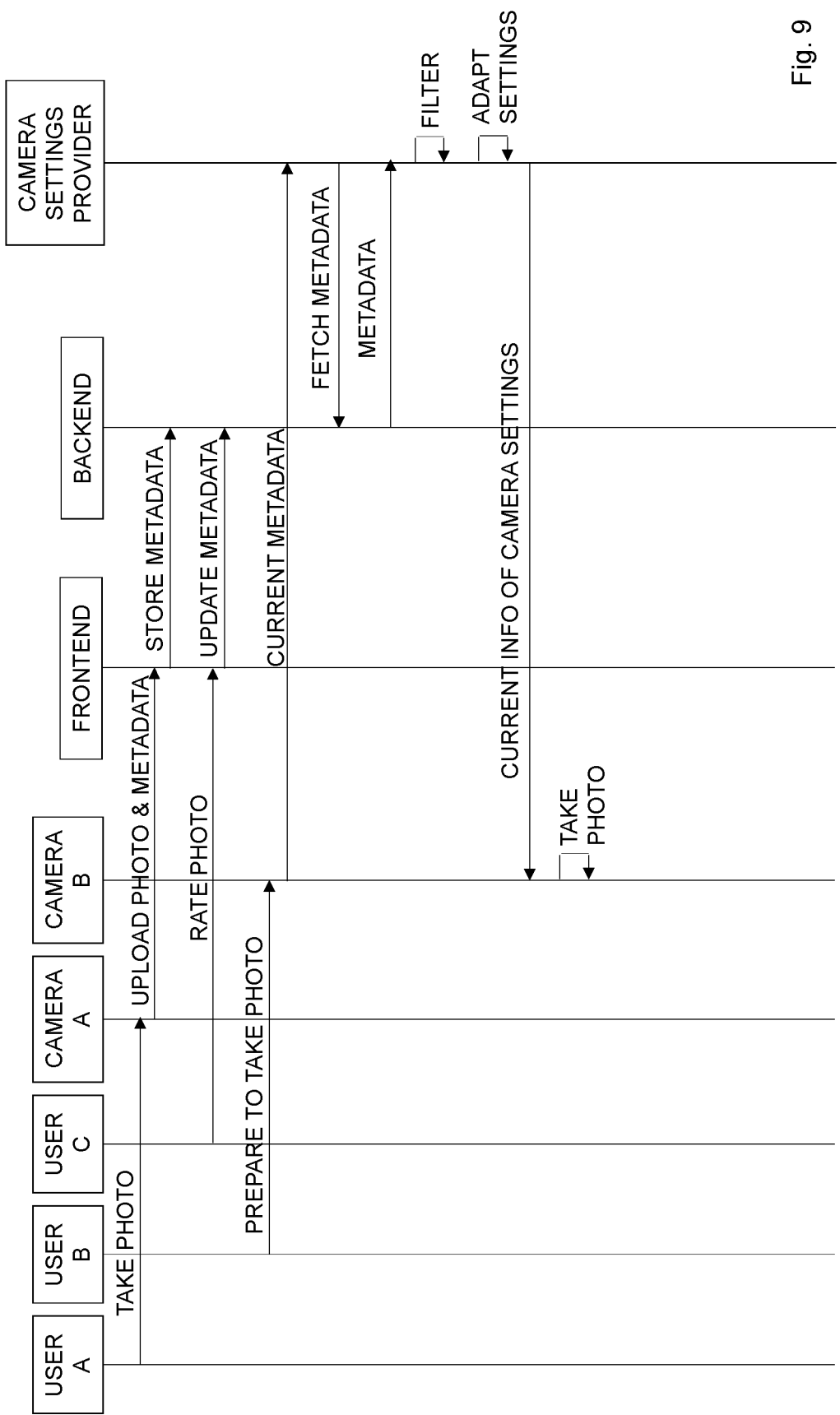
FIG. 9 is a signal diagram illustrating providing camera settings using crowdsourcing according to a further embodiment.

FIG. 9 illustrates a signal diagram in which the image and/or video hosting service is represented by a frontend to which users upload their photographs and associated metadata. The storage of the metadata then takes place at a backend, such as in the form of Home Subscriber Server (HSS). This means that camera A uploads a photograph and metadata to the frontend when user A has taken a photograph. The frontend stores the metadata at a backend. If a user C views a photograph and rates it, the frontend forwards the user rating to the backend, where the metadata associated with the rated photograph is updated to include the user rating by user C. The following signaling when user B is about to take a photograph is the same as in FIG. 7. In this case, the camera settings provider transmits a request for metadata from the backend using the current position data retrieved from the current metadata received from camera B. The metadata received from the backend may be filtered in a selection process as disclosed in FIG. 8. This embodiment also adapts the camera settings based on identifiers of camera A and camera B prior to compiling and transmitting the current information representative of the adapted camera settings to camera B.

FIG. 10 illustrates a variant of the adaptation of camera settings. Following the optional filtering and selection process, the camera settings provider transmits the camera settings and identifiers of camera A and camera B to an adapter or settings adapting unit. The adapter adapts or adjusts the received camera settings based on the capabilities of the two cameras A, B as determined based on the received identifiers. The adapted camera settings are returned to the camera settings provider, which then compiles and transmits the current information representative of the adapted camera settings to camera B.

Another aspect of the embodiments relates to a device for providing camera settings. The device is configured to retrieve, based on current metadata comprising current position data of a current camera and from a storage, metadata comprising position data and information representative of camera settings for photographs and/or videos available on at least one image and/or video hosting service. The device is also configured to provide, for transmission to the current camera, current information representative of camera settings used when taking a photograph or recording a video selected among the photographs and/or videos available on the at least one image and/or video hosting service.

In an embodiment, the device is configured to receive a request for camera settings from the current camera, the request comprises the current metadata.

The device is preferably configured to fetch the metadata from the storage based on the current position data retrieved from the current metadata.

In an embodiment, the device is configured to retrieve, from the storage, metadata comprising position data defining a position matching a current position of the current camera as defined by the position data comprised in the current metadata.

In an embodiment, the current metadata comprises current direction data for the current camera and the metadata comprises direction data for a camera used when taking a photograph or recording a video of the photographs and/or videos available on the at least one image and/or video hosting service. In such a case, the device is preferably configured to select metadata among the metadata retrieved from the storage based on the current direction data retrieved from the current metadata and the direction data retrieved from the metadata.

In a particular embodiment, the device is configured to select metadata associated with a photograph or video, among the photographs and/or videos available on the at least one image and/or video hosting service, taken or recorded at a position matching a current position of the current camera as defined by the current position data comprised in the current metadata and in a direction matching the current direction of the current camera as defined by the current direction data retrieved from the current metadata.

In an embodiment, the current metadata comprises information of initial camera settings of the current camera. In such a case, the device is preferably configured to select metadata among the metadata retrieved from the storage based on the information of initial camera settings retrieved from the current metadata and the information representative of the camera settings retrieved from the metadata.

In a particular embodiment, the device is configured to select metadata associated with a photograph or video, among the photographs and/or videos available on the at least one image and/or video hosting service, taken or recorded by a camera having a focal length as defined by the information representative of the camera settings retrieved from the metadata matching an initial focal length of the current camera as defined by the information of the initial camera settings retrieved from the current metadata.

In another particular embodiment, the device is configured to select metadata associated with a photograph or video, among the photographs and/or videos available on the at least one image and/or video hosting service, taken or recorded by a camera having a camera mode as defined by the information representative of the camera settings retrieved from the metadata matching an initial camera mode of the current camera as defined by the information of the initial camera settings retrieved from the current metadata.

In an embodiment, the current metadata comprises information of a current time of day and the metadata comprises information of a time of day at which a photograph was taken or a video was recorded. In such a case, the device is preferably configured to select metadata among the metadata retrieved from the storage based on the information of current time of day retrieved from the current metadata and the information of the time of day retrieved from the metadata.

In an embodiment, the photographs and/or videos available on the at least one image and/or video hosting service have a respective user rating. In such a case, the device is preferably configured to select metadata among the metadata retrieved from the storage based on the user ratings retrieved from the metadata.

In a particular embodiment, the device is configured to select metadata associated with the N≥1 photographs and/or videos having the highest user ratings among the photographs and/or videos available on the at least one image and/or video hosting service.

In another particular embodiment, the device is configured to select metadata associated with at least one photograph and/or video having a user rating equal to or higher than a minimum user rating among the photographs and/or videos available on the at least one image and/or video hosting service.

In an embodiment, the current metadata comprises an identifier of the current camera and the metadata comprises an identifier of a camera used when taking a photograph or recording a video of the photographs and/or videos available on the at least one image and/or video hosting service. In such a case, the device is preferably configured to provide adapted camera settings obtained by adapting, based on the identifier of the current camera and an identifier of a camera, camera settings defined by metadata retrieved from the storage. The device is also configured to provide current information of the adapted camera settings for transmission to the current camera.

In a particular embodiment, the device is configured to forward information representative of camera settings, the identifier of the current camera and the identifier of the camera to a settings adapting unit. The device is also configured to receive the adapted camera settings from the settings adapting unit.

In an embodiment, the device is configured to transmit the current information of the camera settings to the current camera.

In another embodiment, the device is configured to transmit the current information of the camera settings to a network node of a wireless communication network for temporary pre-caching of the current information of the camera settings prior to transmission of the current information of the camera settings to the current camera.

It will be appreciated that the methods and devices described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 11:
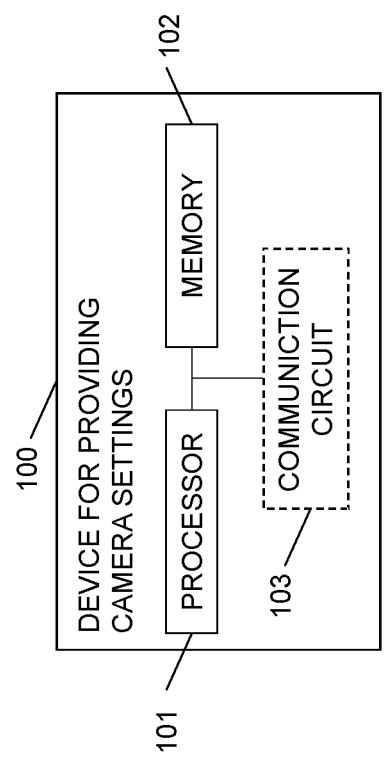
FIG. 11 is a schematic block diagram of a device for providing camera settings according to an embodiment.

FIG. 11 is a schematic block diagram illustrating an example of a device 100 for providing camera settings based on a processor-memory implementation according to an embodiment. In this particular example, the device 100 comprises a processor 101 and a memory 102. The memory 102 comprises instructions executable by the processor 101, whereby the processor 101 is operative to retrieve the metadata from the storage based on the current metadata. The processor 101 is also operative to provide the current information representative of camera settings.

Optionally, the device 100 may also include a communication circuit 103. The communication circuit 103 may include functions for wired and/or wireless communication with other devices and/or network nodes in the network. In a particular example, the communication circuit 103 may be based on radio circuitry for communication with one or more other nodes, including transmitting and/or receiving information. The communication circuit 103 may be interconnected to the processor 101 and/or memory 102. By way of example, the communication circuit 103 may include any of the following: a receiver, a transmitter, a transceiver, input/output (I/O) circuitry, input port(s) and/or output port(s).

Figure 12:
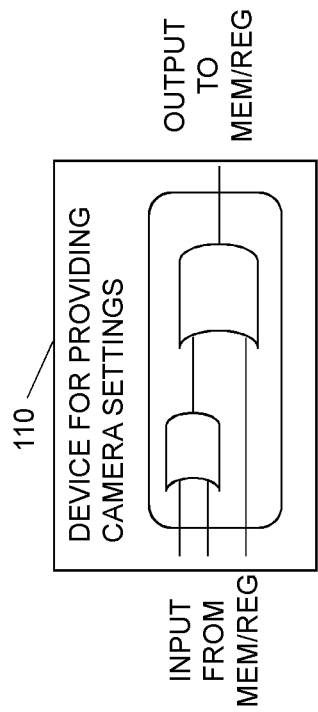
FIG. 12 is a schematic block diagram of a device for providing camera settings according to another embodiment.

FIG. 12 is a schematic block diagram illustrating another example of a device 110 for providing camera settings based on a hardware circuitry implementation according to an embodiment. Particular examples of suitable hardware circuitry include one or more suitably configured or possibly reconfigurable electronic circuitry, e.g. Application Specific Integrated Circuits (ASICs), FPGAs, or any other hardware logic such as circuits based on discrete logic gates and/or flip-flops interconnected to perform specialized functions in connection with suitable registers (REG), and/or memory units (MEM).

Figure 13:
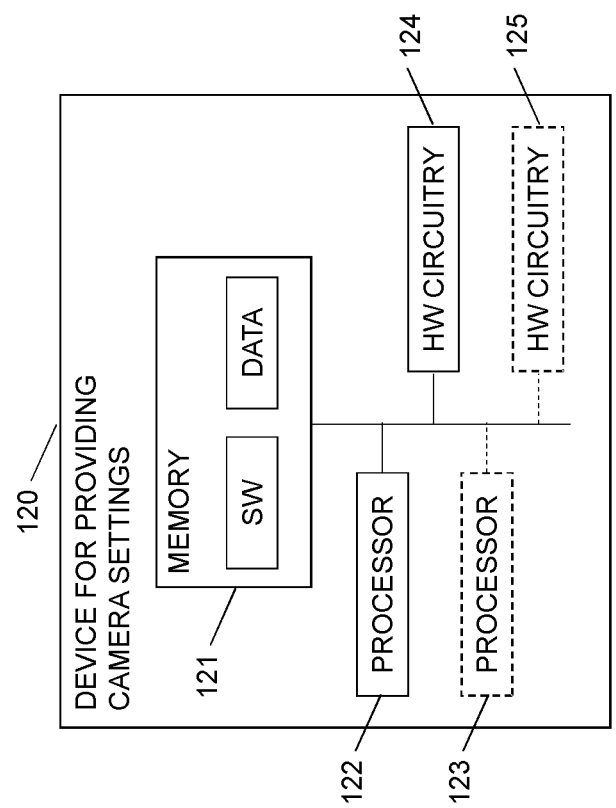
FIG. 13 is a schematic block diagram of a device for providing camera settings according to a further embodiment.

FIG. 13 is a schematic block diagram illustrating yet another example of a device 120 for providing camera settings based on combination of both processor(s) 122, 123 and hardware circuitry 124, 125 in connection with suitable memory unit(s) 121. The device 120 comprises one or more processors 122, 123, memory 121 including storage for software (SW) and data, and one or more units of hardware circuitry 124, 125, such as ASICs and/or FPGAs. The overall functionality is thus partitioned between programmed software for execution on one or more processors 122, 123 and one or more pre-configured or possibly reconfigurable hardware circuits 124, 125. The actual hardware-software partitioning can be decided by a system designer based on a number of factors including processing speed, cost of implementation and other requirements.

Figure 14:
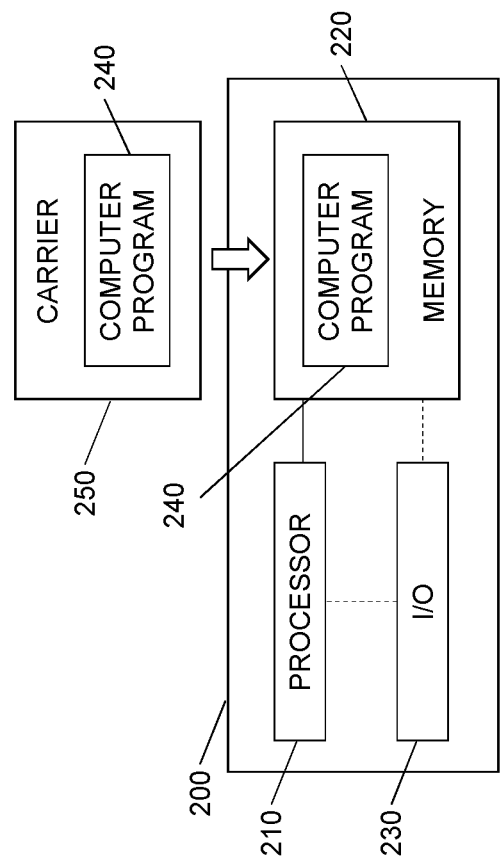
FIG. 14 is a schematic block diagram of a computer-program-based implementation of an embodiment.

FIG. 14 is a schematic diagram illustrating an example of a computer-implementation of a device for providing camera settings 200 according to an embodiment. In this particular example, at least some of the steps, functions, procedures, modules and/or blocks described herein are implemented in a computer program 240, which is loaded into the memory 220 for execution by processing circuitry including one or more processors 210. The processor(s) 210 and memory 220 are interconnected to each other to enable normal software execution. An optional I/O device 230 may also be interconnected to the processor(s) 210 and/or the memory 220 to enable input and/or output of relevant data, such as metadata and information of camera settings.

The term 'processor' should be interpreted in a general sense as any system or device capable of executing program code or computer program instructions to perform a particular processing, determining or computing task.

The processing circuitry including one or more processors 210 is thus configured to perform, when executing the computer program 240, well-defined processing tasks such as those described herein.

The processing circuitry does not have to be dedicated to only execute the above-described steps, functions, procedure and/or blocks, but may also execute other tasks.

In a particular embodiment, the computer program 240 comprises instructions, which when executed by at least one processor 210, cause the at least one processor 210 to retrieve, based on current metadata comprising current position data of a current camera and from a storage, metadata comprising position data and information representative of camera settings for photographs and/or videos available on at least one image and/or video hosting service. The at least one processor 210 is also caused to provide, for transmission to the current camera, current information representative of camera settings used when taking a photograph or recording a video selected among the photographs and/or videos available on the at least one image and/or video hosting service.

The proposed technology also provides a carrier 250 comprising the computer program 240. The carrier 250 is one of an electronic signal, an optical signal, an electromagnetic signal, a magnetic signal, an electric signal, a radio signal, a microwave signal, or a computer-readable storage medium.

By way of example, the software or computer program 240 may be realized as a computer program product, which is normally carried or stored on a computer-readable medium 250, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program 240 may thus be loaded into the operating memory of a computer or equivalent processing device for execution by the processing circuitry thereof.

The flow diagram or diagrams presented herein may be regarded as a computer flow diagram or diagrams, when performed by one or more processors. A corresponding device may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 15:
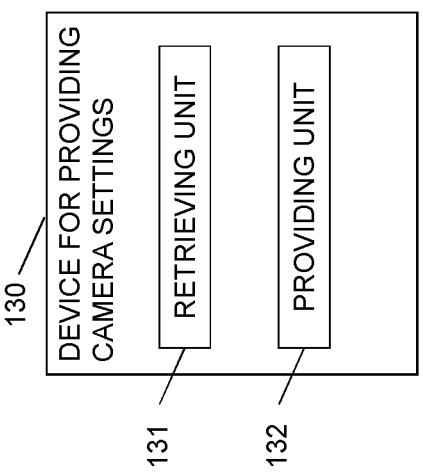
FIG. 15 is a schematic block diagram of a device for providing camera settings according to yet another embodiment.

FIG. 15 is a schematic diagram illustrating an example of a device 130 for providing camera settings implemented using such function modules. The device 130 comprises a retrieving unit 131 for retrieving, based on current metadata comprising current position data of a current camera and from a storage, metadata comprising position data and information representative of camera settings for photographs and/or videos available on at least one image and/or video hosting service. The device 130 also comprises a providing unit 132 for providing, for transmission to the current camera, current information representative of camera settings used when taking a photograph or recording a video selected among the photographs and/or videos available on the at least one image and/or video hosting service.

Alternatively it is possible to realize the modules 131, 132 in FIG. 130 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or ASICs as previously mentioned. Other examples of usable hardware include I/O circuitry and/or circuitry for receiving and/or sending signals. The extent of software versus hardware is purely implementation selection.

A further aspect of the embodiments relates to a network node comprising a device for providing camera settings according to the embodiments, such a device as shown in any of FIGS. 11-13, 15.

A network node may refer to base stations; access points; network control nodes, such as network controllers, radio network controllers, base station controllers, access controllers; and the like. In particular, the term base station may encompass different types of radio base stations including standardized base station functions, such as Node Bs, or evolved Node Bs (eNBs), and also macro/micro/pico radio base stations, home base stations, also known as femto base stations, relay nodes, repeaters, radio access points, Base Transceiver Stations (BTSs), and even radio control nodes controlling one or more Remote Radio Units (RRUs), or the like.

It is becoming increasingly popular to provide computing services, such as hardware and/or software, in network devices, such as network nodes and/or servers, where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

Although it may often desirable to centralize functionality in so-called generic data centres, in other scenarios it may in fact be beneficial to distribute functionality over different parts of the network.

Figure 16:
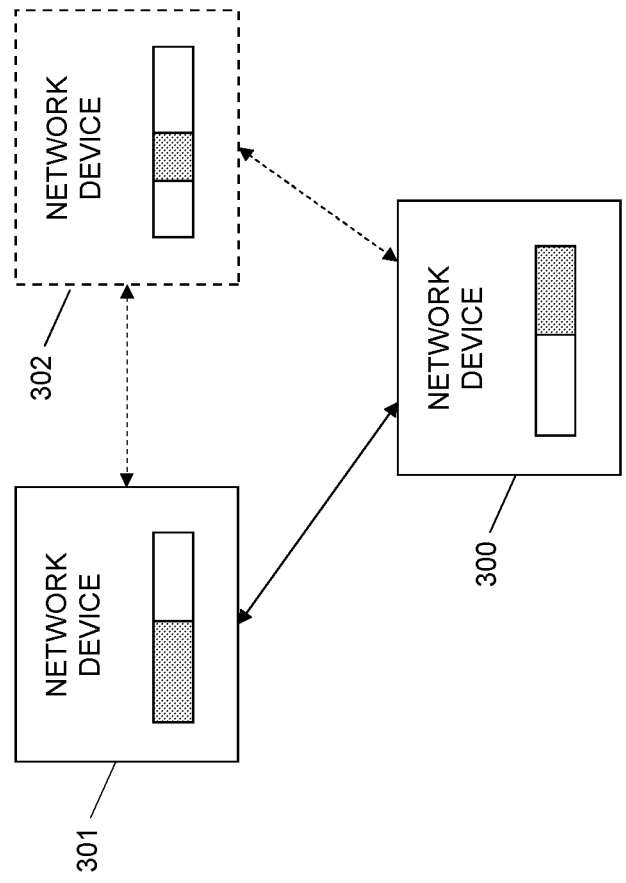
FIG. 16 schematically illustrates a distributed implementation among multiple network devices.

FIG. 16 is a schematic diagram illustrating an example of how functionality can be distributed or partitioned between different network devices 300, 310 in a general case. In this example, there are at least two individual, but interconnected network devices 300, 301, which may have different functionalities, or parts of the same functionality, partitioned between the network devices 300, 301. There may be additional network devices 302 being part of such a distributed implementation. The network devices 300, 301, 302 may be part of the same wireless communication system, or one or more of the network devices may be so-called cloud-based network devices located outside of the wireless communication system.

Figure 17:
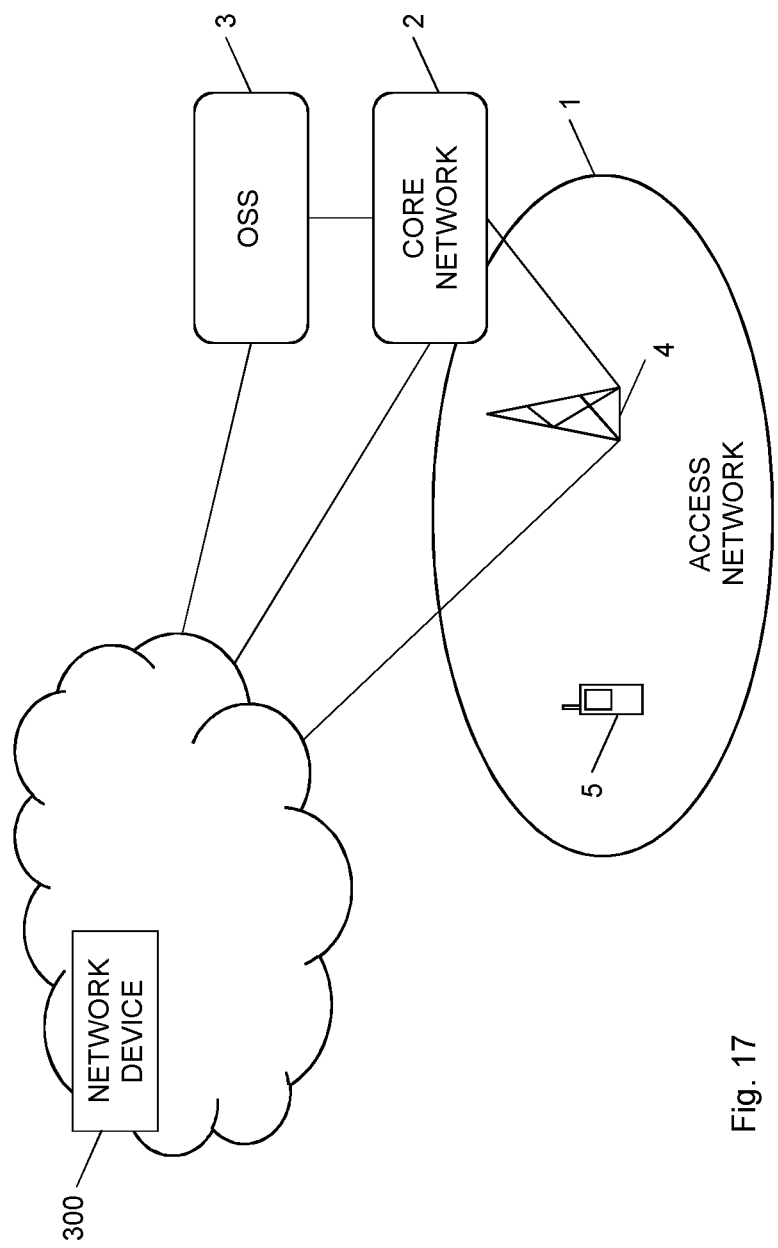
FIG. 17 is a schematic illustration of an example of a wireless communication system with one or more cloud-based network devices according to an embodiment.

FIG. 17 is a schematic diagram illustrating an example of a wireless communication system, including an access network 1 and/or a core network 2 and/or an Operations and Support System (OSS) 3 in cooperation with one or more cloud-based network devices 300. The figure also illustrates a network node 4 of the access network 1 and a user device 5 including a camera and circuitry for conducting wireless communication with the network node 4.

By way of example, the network device 300 may be implemented in hardware, software or a combination thereof. For example, the network device 300 may be a special-purpose network device or a general purpose network device, or a hybrid thereof.

A special-purpose network device may use custom processing circuits and a proprietary operating system (OS), for execution of software to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a wireless network interface controller (WNIC) or through plugging in a cable to a physical port connected to a network interface controller (NIC). During operation, the software may be executed by the hardware to instantiate a set of one or more software instance(s). Each of the software instance(s), and that part of the hardware that executes that software instance, may form a separate virtual network element.

A general purpose network device may use common off-the-shelf (COTS) processors and a standard OS, for execution of software configured to provide one or more of the features or functions disclosed herein.

By way of an example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them, be it hardware dedicated to that execution and/or time slices of hardware temporally shared by software containers, forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, NDs, and Customer Premise Equipment (CPE).

The cameras of the embodiments could be any digital camera capable of taking photographs and/or recording videos and generating metadata that is associated with the photographs and/or videos as described herein. The cameras also comprise communication circuitry capable of conducting communication, preferably wireless communication. Alternatively, a camera can be incorporated into or connected to a user device or user equipment comprising such a communication circuitry.

The user device or user equipment may refer to a mobile phone, a cellular phone, a smart phone, a Personal Digital Assistant (PDA) equipped with communication circuitry, a laptop or Personal Computer (PC) equipped with an internal or external mobile broadband modem, a tablet with communication circuitry, etc. In particular, the communication circuitry of the camera, user device or user equipment is capable of wireless communication with external devices, possibly within a wireless local area network (WLAN) or a wireless radio-based communication network comprising network nodes as shown in FIG. 17.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method of providing camera settings, said method comprising:

retrieving, based on current metadata comprising current position data of a current camera and from a storage, metadata comprising position data and information representative of camera settings for photographs and/or videos available on at least one image and/or video hosting service; and providing, for transmission to said current camera, current information representative of camera settings used when taking a photograph or recording a video selected among said photographs and/or videos available on said at least one image and/or video hosting service, wherein said current metadata comprises information of initial camera settings of said current camera, and said method further comprises selecting metadata among said metadata retrieved from said storage based on said information of initial camera settings retrieved from said current metadata and said information representative of said camera settings retrieved from said metadata, and said selecting said metadata based on said information of initial camera settings and said information representative of said camera settings comprises selecting metadata associated with a photograph or video, among said photographs and/or videos available on said at least one image and/or video hosting service, taken or recorded by a camera having a focal length as defined by said information representative of said camera settings retrieved from said metadata matching an initial focal length of said current camera as defined by said information of said initial camera settings retrieved from said current metadata.

2. The method of claim 1, further comprising receiving a request for camera settings from said current camera, said request comprises said current metadata.

3. The method of claim 1, wherein retrieving said metadata comprises fetching said metadata from said storage based on said current position data retrieved from said current metadata.

4. The method of claim 1, wherein retrieving said metadata comprises retrieving, from said storage, metadata comprising position data defining a position matching a current position of said current camera as defined by said position data comprised in said current metadata.

5. The method claim 1, wherein said current metadata comprises current direction data for said current camera and said metadata comprises direction data for a camera used when taking a photograph or recording a video of said photographs and/or videos available on said at least one image and/or video hosting service, said method further comprising:
 selecting metadata among said metadata retrieved from said storage based on said current direction data retrieved from said current metadata and said direction data retrieved from said metadata.

6. The method of claim 5, wherein selecting said metadata comprises selecting metadata associated with a photograph or video, among said photographs and/or videos available on said at least one image and/or video hosting service, taken or recorded at a position matching a current position of said current camera as defined by said current position data comprised in said current metadata and in a direction matching said current direction of said current camera as defined by said current direction data retrieved from said current metadata.

7. The method of claim 1, wherein selecting said metadata comprises selecting metadata associated with a photograph or video, among said photographs and/or videos available on said at least one image and/or video hosting service, taken or recorded by a camera having a camera mode as defined by said information representative of said camera settings retrieved from said metadata matching an initial camera mode of said current camera as defined by said information of said initial camera settings retrieved from said current metadata.

8. The method of claim 1, wherein said photographs and/or videos available on said at least one image and/or video hosting service have a respective user rating, said method further comprising:
 selecting metadata among said metadata retrieved from said storage based on said user ratings retrieved from said metadata.

9. The method of claim 8, wherein selecting said metadata comprises selecting metadata associated with a set of photographs and/or videos having the highest user ratings among said photographs and/or videos available on said at least one image and/or video hosting service.

10. The method of claim 8, wherein selecting said metadata comprises selecting metadata associated with at least one photograph and/or video having a user rating equal to or higher than a minimum user rating among said photographs and/or videos available on said at least one image and/or video hosting service.

11. The method of claim 1, further comprising transmitting said current information of said camera settings to said current camera.

12. The method of claim 1, further comprising transmitting said current information of said camera settings to a network node of a wireless communication network for temporary pre-caching of said current information of said camera settings prior to transmission of said current information of said camera settings to said current camera.

13. A computer program product comprising a non-transitory computer readable medium storing a computer program comprising instructions for causing a processing unit to perform the method of claim 1.

14. A method of providing camera settings, said method comprising:
 retrieving, based on current metadata comprising current position data of a current camera and from a storage, metadata comprising position data and information representative of camera settings for photographs and/or videos available on at least one image and/or video hosting service; and
 providing, for transmission to said current camera, current information representative of camera settings used when taking a photograph or recording a video selected among said photographs and/or videos available on said at least one image and/or video hosting service, wherein
 said current metadata comprises an identifier of said current camera and said metadata comprises an identifier of a camera used when taking a photograph or recording a video of said photographs and/or videos available on said at least one image and/or video hosting service, said method further comprising:
 providing adapted camera settings obtained by adapting, based on said identifier of said current camera and an identifier of a camera, camera settings defined by metadata retrieved from said storage, wherein
 providing said current information representative of camera settings comprises providing current information of said adapted camera settings for transmission to said current camera.

15. The method of claim 14, wherein providing said adapted camera settings comprises:
 forwarding information representative of camera settings, said identifier of said current camera and said identifier of said camera to a settings adapting unit; and
 receiving said adapted camera settings from said settings adapting unit.

16. A computer program product comprising a non-transitory computer readable medium storing a computer program comprising instructions for causing a processing unit to perform the method of claim 14.

17. A device for providing camera settings, the device comprising
 a processor; and
 a memory comprising instructions executable by said processor, wherein the processor is configured to:
 retrieve, based on current metadata comprising current position data of a current camera and from a storage, metadata comprising position data and information representative of camera settings for photographs and/or videos available on at least one image and/or video hosting service; and
 provide, for transmission to said current camera, current information representative of camera settings used when taking a photograph or recording a video selected among said photographs and/or videos available on said at least one image and/or video hosting service, wherein
 said current metadata comprises information of initial camera settings of said current camera, and
 said processor is further configured to select metadata among said metadata retrieved from said storage based on said information of initial camera settings retrieved from said current metadata and said information representative of said camera settings retrieved from said metadata, and said processor is configured to select said metadata based on said information of initial camera settings and said information representative of said camera settings by performing a process that comprises selecting metadata associated with a photograph or video, among said photographs and/or videos available on said at least one image and/or video hosting service, taken or recorded by a camera having a focal length as defined by said information representative of said camera settings retrieved from said metadata matching an initial focal length of said current camera as defined by said information of said initial camera settings retrieved from said current metadata.

* * * * *